Patented Jan. 22, 1946

2,393,293

UNITED STATES PATENT OFFICE 2,393,293

DESTRUCTION OF ALGAE

Hoyt M. Corley, Chicago, Ill., assignor to Armour and Company, Chicago, Ill., a corporation of Illinois No Drawing. Application October 28, 1940, Serial No. 363,172

5 Claims. (Cl. 210—23)

This invention is concerned with a process for destroying lower forms of plant growths and it particularly concerns the destruction and inhibition of the growth of algae. In a special sense, it refers to the destruction of and the prevention of the growth of algae in industrial water systems.

Water supply systems are frequently polluted by growths of algae and other microorganisms which become a source of great trouble in the operation of these water systems, particularly in sprinkling or filtering operations. Some of the organisms decompose in the filter beds and lend undesirable tastes and odors to the water being filtered. Unpleasant, fishy tastes and odors are also produced as a result of the growth of some algae, especially the type known as blue-green algae; other organisms also, such as slime bacteria, surround themselves during growth with a gelatinous secretion, actually forming slimy masses which are quite undesirable in cooling systems, for example, where they seriously interfere with the flow of water. Some microorganisms, such as Crenothrix, grow best in water containing iron. These organisms deposit iron in or on their bodies and form nodules of iron rust upon the interior of the pipe-lines. The lines eventually become clogged, or much smaller in diameter, due to the formation of these rust deposits. A more important disadvantage of the common growth of slime depositing organisms such as algae in association with these other organisms in refrigerating systems, however, is that the gelatinous material produced by all these organisms growing together forms an insulating coating over the heat transfer surfaces, such as pipes, and prevents maximum heat exchange.

For these reasons it is apparent that it is a problem of prime commercial importance to prevent or to destroy such growths of micro-organisms. Various means have been suggested and employed for preventing or destroying these growths but they have all possessed certain disadvantages. Copper salts, for instance, are known to be good algicides but their bactericidal action is practically nil. On the other hand, known bactericides are ineffective in killing algae. Creosote, for example, is an excellent bactericidal agent but is quite unsatisfactory as an algicide. The same may be said of chlorine because of the difficulty of maintaining a good concentration of chlorine in waters under the conditions favorable to the growth of algae. Other materials which are toxic to algae are so highly toxic and harmful to humans, both internally and externally as in contact with skin, as to make their use extremely hazardous. Algae have been removed from water by filtration but in removing algae in this manner the filters quickly become clogged, thus increasing filtration costs, and it is also necessary to aerate the water very thoroughly. In general, filtration is unsatisfactory where the growth is heavy.

I have now discovered that the growth or development of algae in water systems, reservoirs and the like, is prevented or destroyed by the presence of water-soluble salts of primary aliphatic amines, the hydrocarbon radical of which contains at least twelve carbon atoms. Where a heavy growth of algae has already developed, I have found that it can be destroyed by the addition of suitable amounts of these amine salts, such as octadecyl amine acetate, octadecenyl amine acetate, dodecylamine hydrochloride and the like, and it is observed during this treatment that slime deposits which have formed break loose and float away. After a heavy growth has been destroyed, a much lower concentration is required, of course, to prevent re-infestation, or to prevent infestation and growth of the undesired organisms in a newly installed system.

The coating deposits which form on the pipes in a cooling or refrigerating system are evidently produced by algae growing in conjunction with slime-forming bacteria and with the so-called iron bacteria, such as Crenothrix, and the addition of suitable amounts of water-soluble amine salts destroy these coatings by killing the algae growth and also by exerting their bactericidal effect upon the bacteria present. It has not heretofore been known that the amine salts of this invention are efficient algicides, but tests on pure cultures of algae have now proved that these amine salts are lethal to these organisms. The formation of coating deposits on cooling or refrigerating pipes can be prevented by adding a small amount of a water-soluble salt of a primary aliphatic amine to a system which has not yet been infested with the algae and associated organisms causing such deposits.

I have found that the addition to water of the amine salts of my invention in the amount of 25 parts per million will destroy algae. In cases where a very heavy growth has developed, larger concentrations of the order of 40–50 parts per million or even higher will be required, while for very slight growth or to prevent growth or reinfestation in a water system substantially free of algae smaller amounts, of the order of about 15 parts per million, will be sufficient.

The following example will describe more specifically the manner of carrying out my process:

Example

A reservoir of 1,000,000 gallon capacity is used for supplying water to an atmospheric ammonia condenser system. Water is pumped over the atmospheric condensers from this reservoir, collected in pans and returned to the reservoir, where dilution water is added as required to make up evaporation and physical losses. The entire system was infested with a luxuriant growth of algae and the condenser pipes exhibited a slimy coating. The reservoir is filled with about 750,000 gallons of water and there are added 150 lbs. of a mixture of hexadecyl amine acetate and octadecyl amine acetate, which is equivalent to a concentration of 25 parts per million. The system is put in operation and after 24 hours the destructive effect upon the algae growth is quite evident. At the end of a week sufficient dilution water has been added to dilute the solution to about one-half its original strength. The growth in the system is very much less. However, another 25 parts per million of the amine acetate mixture is now added and the system operated for another week at the end of which time, it is substantially free of algae growth and the pipes are free of any slimy coating.

In a plant located in the South Central portion of the United States where temperature and other conditions favor luxuriant growth of algae, it is necessary to maintain the concentration of the amine salt in the cooling water at 25 parts per million in order to prevent the growth of algae and the formation of slimy coatings upon the heat transfer surfaces of the ammonia condenser system. In this plant there is an in-put of water, compensating for water withdrawn from the system, amounting to 50,000 gallons per day resulting in a high daily re-inoculation of the undesired microflora. In places where make-up water, for example, is obtained from ponds in which algae growth is favored more amine salt will be required to control the system than in localities where make-up water is obtained from filtered-water supply systems. Also, in localities farther north where temperature and other conditions are less favorable to the growth of these microflora, less amine salt, about 15 parts per million, is added to keep the systems clear of algae and slimy coatings, once the growth of such microflora has been brought under control.

Where, on the other hand, a larger amount of amine salt than, for example, 25 parts per million, is required, it may be added all at once instead of step-wise as shown in the example.

The amine salts used in this process may be any water-soluble salt of a primary aliphatic amine in which the hydrocarbon radical contains at least twelve carbon atoms, such as oleyl amine hydrochloride, stearyl amine acetate, lauryl amine hydrochloride and the like. An advantage of using these amine salts over the treating agents of the prior art is that they are not corrosive; another advantage is that besides being excellent algicides they are also bactericides, which properties are independent of each other; another advantage is that they are stable under the conditions of use.

While I have described specific ways of carrying out my process, it will be understood that other specific ways may be employed, and various changes and modifications may be made in the practice of this process without departing from the spirit of this invention. The foregoing detailed description and example has been given for purposes of explanation only and no unnecessary limitations should be understood therefrom.

Having thus described my invention, what I wish to claim is:

1. A process for treating algae to destroy the same comprising contacting with said algae an aqueous solution of a water-soluble salt of a primary aliphatic amine, the hydrocarbon radical of which contains at least 12 carbon atoms.

2. A process for treating algae to destroy the same comprising contacting with said algae an aqueous solution containing at least 15 parts per million of a water-soluble salt of a primary aliphatic amine, the hydrocarbon radical of which contains at least 12 carbon atoms.

3. A process as in claim 1 wherein the water-soluble salt of a primary aliphatic amine is octadecylamine acetate.

4. A process as in claim 1 wherein the water-soluble salt of a primary aliphatic amine is octadecenylamine acetate.

5. A process for destroying algae in a water system infected with algae comprising circulating in said system an aqueous solution of a water-soluble primary aliphatic amine salt, the hydrocarbon radical of which contains at least 12 carbon atoms.

HOYT M. CORLEY.